US012510854B2

(12) United States Patent
Sekimizu et al.

(10) Patent No.: US 12,510,854 B2
(45) Date of Patent: Dec. 30, 2025

(54) SHEET DISCHARGE APPARATUS AND IMAGE FORMING APPARATUS

(71) Applicant: CANON KABUSHIKI KAISHA, Tokyo (JP)

(72) Inventors: Koichi Sekimizu, Shizuoka (JP); Seiji Obata, Shizuoka (JP); Hideki Ohta, Shizuoka (JP); Takehito Osada, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 48 days.

(21) Appl. No.: 17/825,398

(22) Filed: May 26, 2022

(65) Prior Publication Data

US 2022/0382198 A1 Dec. 1, 2022

(30) Foreign Application Priority Data

May 31, 2021 (JP) ................................ 2021-090900

(51) Int. Cl.
*B65H 15/00* (2006.01)
*G03G 15/00* (2006.01)
*G03G 15/23* (2006.01)

(52) U.S. Cl.
CPC ......... *G03G 15/234* (2013.01); *B65H 15/004* (2020.08); *G03G 15/6552* (2013.01); *G03G 15/6579* (2013.01); *G03G 2215/0043* (2013.01)

(58) Field of Classification Search
CPC ............. G03G 15/234; G03G 15/6552; G03G 15/6579; G03G 2215/0043; B65H 15/004
See application file for complete search history.

(56) References Cited

U.S. PATENT DOCUMENTS

| | | | | |
|---|---|---|---|---|
| 8,087,666 | B2 * | 1/2012 | Honda | B65H 29/14 271/220 |
| 10,384,902 | B2 | 8/2019 | Shiina | |
| 10,474,087 | B2 | 11/2019 | Makino | |
| 2018/0088514 | A1 * | 3/2018 | Makino | G03G 15/6552 |
| 2018/0179010 | A1 * | 6/2018 | Nakamura | B65H 43/06 |

(Continued)

FOREIGN PATENT DOCUMENTS

| | | | |
|---|---|---|---|
| JP | 9-221266 | * | 8/1997 |
| JP | 2007-22691 | * | 2/2007 |

(Continued)

OTHER PUBLICATIONS

Machine translation of JP9-221266. (Year: 1997).*
Machine translation of JP2007-22691. (Year: 2007).*

*Primary Examiner* — Thomas A Morrison
(74) *Attorney, Agent, or Firm* — ROSSI, KIMMS & McDOWELL LLP

(57) ABSTRACT

A sheet discharge apparatus includes a stack portion, a reversing unit configured to reverse a reversing sheet, a support member configured to support a lower surface of the reversing sheet, a discharging unit configured to discharge a discharging sheet from the apparatus body, a pivotable member arranged above the stack portion, and a detector configured to output a detection signal that changes according to a pivot angle of the pivotable member. When viewed in a sheet width direction perpendicular to the first conveyance direction, a pivoting locus in which the pivotable member pivots overlaps the support member.

10 Claims, 7 Drawing Sheets

(56) References Cited

U.S. PATENT DOCUMENTS

| | | | | |
|---|---|---|---|---|
| 2019/0033769 | A1 * | 1/2019 | Shiina .................... | B65H 43/06 |
| 2019/0225453 | A1 * | 7/2019 | Sato ....................... | B65H 31/24 |

FOREIGN PATENT DOCUMENTS

| | | | |
|---|---|---|---|
| JP | 2010260679 | A | 11/2010 |
| JP | 2018052675 | A | 4/2018 |
| JP | 2018108873 | A | 7/2018 |
| JP | 2019026405 | A | 2/2019 |
| JP | 2019077548 | A | 5/2019 |

* cited by examiner

SHEET DISCHARGE APPARATUS AND IMAGE FORMING APPARATUS

BACKGROUND OF THE INVENTION

Field of the Invention

The present invention relates to a sheet discharge apparatus that discharges a sheet and an image forming apparatus that forms an image on a sheet.

Description of the Related Art

An image forming apparatus such as a printer, a copier, or a multifunction peripheral forms an image on a sheet that is a recording medium, then discharges the sheet to the outside of the apparatus body, and stacks the sheet on a stack portion such as a sheet discharge tray. In addition, the image forming apparatus having a function of forming images on both sides of the sheet, includes a reversing mechanism that performs reversed conveyance (switchback) of the sheet in order to convey the sheet on which an image has been formed on the first side to an image forming unit again and form an image on the second side.

As such a reversing mechanism, there is known a mechanism in which a reverse conveyance roller pair protrudes a sheet from the apparatus body toward a space above a sheet discharge tray, and then the reverse conveyance roller pair is reversed before the trailing edge of the sheet passes through the reverse conveyance roller pair to reverse the conveyance direction of the sheet. Japanese Patent Application Laid-Open No. 2019-026405 describes an image forming apparatus including a support member (reverse tray) for supporting a part of a sheet protruding from the apparatus body from below to prevent the sheet from sagging during reverse conveyance of the sheet by a reverse conveyance roller pair.

In the configuration described in the above document, a full stack detection flag for detecting that the sheet discharge tray has reached the full-stack state is arranged above the sheet discharge tray and below the support member. However, the vertical arrangement of the full stack detection flag and the support member hinders downsizing of the image forming apparatus in the height direction. In addition, for example, when the position of the support member is shifted downward in order to reduce the size of the apparatus in the height direction, the position of the full stack detection flag is also shifted downward, and the amount of sheets that can be stacked on the sheet discharge tray is limited. Therefore, it is desired to realize a function of detecting a sheet and a function of supporting a sheet being reversely conveyed in a height-wise compact configuration.

SUMMARY OF THE INVENTION

The present invention provides a sheet discharging apparatus and an image forming apparatus that can provide a function to detect a sheet and a function to support a sheet being reversed with a height-wise compact configuration.

According to one aspect of the invention, a sheet discharging apparatus includes a stack portion on which a sheet discharged from an apparatus body is stacked, a reversing unit configured to reverse a reversing sheet by conveying the reversing sheet such that the reversing sheet is protruded from the apparatus body in a first conveyance direction toward a space above the stack portion and then conveying the reversing sheet in a second conveyance direction opposite to the first conveyance direction, a support member configured to support a lower surface of the reversing sheet being conveyed by the reversing unit, the support member being protruded in the first conveyance direction from the apparatus body in the space above the stack portion, a discharging unit configured to discharge a discharging sheet from the apparatus body, the discharging unit being arranged such that the discharging sheet passes below the support member, a pivotable member arranged above the stack portion, positioned below the support member in a state where the pivotable member is not abutted by the discharging sheet, and configured to pivot upward by being abutted by the discharging sheet, and a detector configured to output a detection signal that changes according to a pivot angle of the pivotable member, wherein when viewed in a sheet width direction perpendicular to the first conveyance direction, a pivoting locus in which the pivotable member pivots overlaps the support member.

Further features of the present invention will become apparent from the following description of exemplary embodiments with reference to the attached drawings.

DESCRIPTION OF THE EMBODIMENTS

Hereinafter, embodiments according to the present disclosure will be described with reference to the drawings.

First Embodiment

Figure 1:
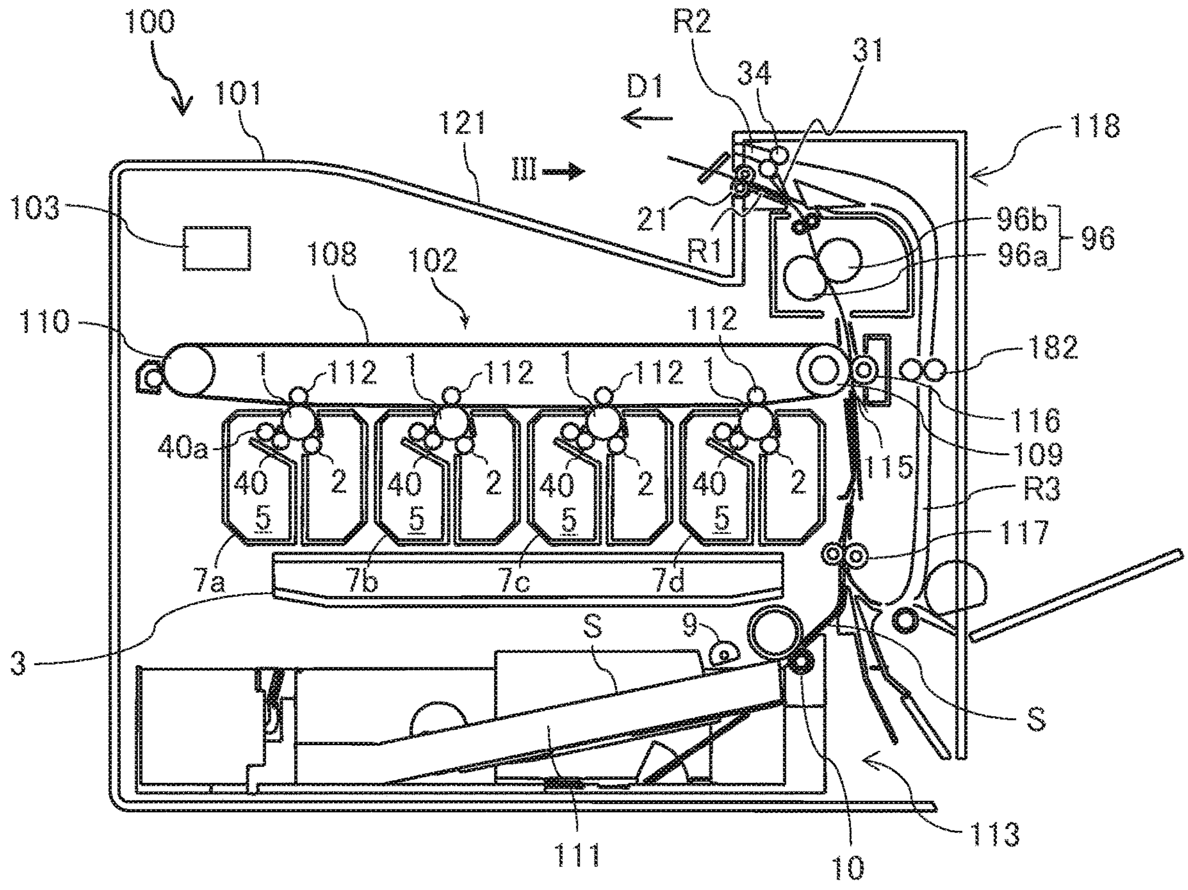
FIG. 1 is a schematic diagram illustrating a cross-sectional configuration of a printer according to a first embodiment.

An overall configuration of a printer 100 serving as an image forming apparatus according to a first embodiment will be described with reference to FIG. 1. As illustrated in FIG. 1, the printer 100 is an electrophotographic laser beam printer including an image forming unit 102 that forms an image on a sheet S, a sheet feeding device 113, a fixing unit 96, and a sheet discharge apparatus 118. When an image forming execution instruction (print instruction) including image information is input from an external device (not illustrated) to a controller 103, the printer 100 forms an image based on the image information on the sheet S and discharges the sheet S as a product. The sheet S as a recording material may be any of various sheet materials having different sizes and materials, such as paper such as plain paper and thick paper, sheet materials subjected to surface treatment such as coated paper, plastic film, cloth, and sheet materials having special shapes such as an envelope and index paper.

The image forming unit 102 serving as an image forming portion includes four process cartridges 7*a*, 7*b*, 7*c*, and 7*d* that form toner images of four colors of yellow, magenta, cyan, and black, respectively, and a scanner unit 3 serving as an exposing unit. These four process cartridges 7*a*, 7*b*, 7*c*, and 7*d* are arranged side by side in a substantially horizontal direction.

The four process cartridges 7*a*, 7*b*, 7*c*, and 7*d* have substantially the same configuration except that colors of toners used to form toner images are different. Each of the process cartridges 7*a* to 7*d* includes a photosensitive drum 1, a charging roller 2, a developing unit 4, a toner unit 5, and a drum cleaning blade 8. The photosensitive drum 1 serving as an image bearing member is an electrophotographic photosensitive member formed in a drum shape. The photosensitive drum 1 is, for example, a member in which an organic photoconductive layer is formed on the outer periphery of an aluminum cylinder, and is rotated by a drive motor (not illustrated) in a clockwise direction illustrated in the drawing. The developing unit 4 includes a developing roller 40 and a developer application roller 40*a*, and is connected to the toner unit 5. The toner unit 5 stores a developer containing toner.

An intermediate transfer belt 108 serving as an intermediate transfer member is arranged above the process cartridges 7*a* to 7*d*. The intermediate transfer belt 108 is stretched around the driving roller 110 and the secondary transfer opposite roller 109, and is conveyed by the rotation of the driving roller 110 in the counterclockwise direction illustrated in the drawing. Inside the intermediate transfer belt 108, primary transfer rollers 112 are arranged at positions facing respective photosensitive drums 1 with the intermediate transfer belt 108 in between. A secondary transfer roller 116 is arranged at a position facing the secondary transfer opposite roller 109 with the intermediate transfer belt 108 in between. The intermediate transfer belt 108 and the secondary transfer roller 116 form a secondary transfer nip serving as a transfer unit (secondary transfer unit 115) where an image is transferred onto the sheet S. The fixing unit 96 is a heat-fusing fixing unit using a heater such as a ceramic heater, in which a heating resistor is arranged on a ceramic substrate, or a halogen lamp. The fixing unit 96 of the present embodiment includes a fixing roller 96*a* heated by the heater, and a pressure roller 96*b* pressed against the fixing roller 96*a*. The sheet feeding device 113 is provided under the printer 100 and houses the sheet S.

The sheet discharge apparatus 118 includes a switching member 31 in a flap shape, a sheet discharge roller pair 21 serving as a discharging unit provided in a discharge path R1, a reverse conveyance roller pair 34 serving as a reversing unit provided in a reverse path R2, and a sheet discharge tray 121. The switching member 31 is a member that switches the conveyance path of the sheet S between the discharge path R1 and the reverse path R2. The sheet discharge tray 121 serving as a stack portion is provided on the upper surface of the apparatus body 101 of the printer 100.

Further, the printer 100 includes a controller 103 serving as a controller that controls the operations of the printer 100. The controller 103 includes a storage device such as a ROM that stores control programs and data for controlling the printer 100, and a CPU that reads the control programs from the storage device and executes the control programs. The controller 103 executes an image forming operation described below, and performs control based on a detection signal of a full stack detection sensor 26 described below, for example. The controller 103 also accepts display of information via a screen of an operation panel serving as a user interface (operation unit) included in the printer 100 and accepts a setting operation for the printer 100 via the operation panel.

Next, an image forming operation of the printer 100 configured as described above will be described. When a print instruction is input from an external device to the controller 103, the photosensitive drums 1 and the intermediate transfer belt 108 are driven, and an image signal (video signal) based on image information is transmitted to the scanner unit 3. The scanner unit 3 irradiates the photosensitive drums 1 of the process cartridges 7*a* to 7*d* with laser light modulated based on the image signal. The surface of the photosensitive drum 1 is uniformly charged to a predetermined polarity and potential in advance by the charging roller 2. Due to irradiation with the laser light from the scanner unit 3, electrostatic latent images are formed on the surfaces of the photosensitive drums 1. The electrostatic latent images formed on the photosensitive drums 1 are developed by the developing units 4, and toner images are formed on the photosensitive drums 1. In each of the developing units 4, toner serving as developer is applied to the developing roller 40 with uniform thickness by the developer application roller 40*a*, and the toner is supplied from the developing roller 40 to the photosensitive drum 1, whereby the electrostatic latent image is developed as a toner image.

The image forming process described above is performed in parallel in the process cartridges 7*a* to 7*d*, and toner images of yellow, magenta, cyan, and black are formed on the four photosensitive drums 1. The toner images formed on the photosensitive drums 1 are transferred to the intermediate transfer belt 108 by the primary transfer rollers 112, and are conveyed to the secondary transfer roller 116 by the intermediate transfer belt 108 conveyed to the driving roller 110. The image forming processes for the four colors are synchronized such that the downstream toner image is superimposed on the upstream toner image primarily transferred onto the intermediate transfer belt 108. After the toner images are transferred, the toner remaining on the surfaces of the photosensitive drums 1 are removed by the drum cleaning blades 8.

In parallel with these image forming processes, the sheets S stored in the cassette 111 of the sheet feeding device 113 are sent out by a pickup roller 9 and separated one by one by a separation roller pair 10. The separation roller pair 10 includes a conveyance roller that conveys the sheets S, and a separation roller that abuts on the conveyance roller to form a separation nip and applies a frictional force to the sheets S to prevent double feeding of the sheets S. The separation roller may be configured such that a driving force in a direction against the rotation of the conveyance roller is input via the torque limiter. Otherwise, the sheets S may be separated by a pad-like friction member instead of the separation roller.

A registration roller pair 117 corrects the skew feeding of the sheet S fed from the separation roller pair 10. Further, the registration roller pair 117 conveys the sheet S to the secondary transfer unit 115 at a timing in synchronization with the image forming process in the image forming unit 102. Then, by applying a transfer voltage to the secondary transfer roller 116, the toner image on the intermediate transfer belt 108 is transferred onto the sheet S in the secondary transfer unit 115. While the sheet S to which the toner image has been transferred is nipped and conveyed by the fixing roller 96*a* and the pressure roller 96*b* of the fixing unit 96, a fixing process of applying heat and pressure to the toner image on the sheet S is performed.

In the case of single-sided printing, the sheet S that has passed through the fixing unit 96 is guided to the discharge path R1 by the switching member 31, and is discharged to the sheet discharge tray 121 serving as the stack portion by the sheet discharge roller pair 21. When images are formed on both sides of the sheet S, the sheet S on which the image has been formed on the first side is guided to the reverse path R2 by the switching member 31. Then, after the trailing edge of the sheet S passes through the switching member 31, the sheet S is reversely conveyed (switched back) by the reverse conveyance roller pair 34, guided by the switching member 31, and conveyed to a double-sided conveyance path R3. Accordingly, the sheet S is conveyed again toward the secondary transfer unit 115 in a state where the leading edge and the trailing edge are interchanged and the first side and the second side are interchanged. Thereafter, the image is transferred onto the second side of the sheet S in the secondary transfer unit 115, and the sheet S is subjected to a fixing process in the fixing unit 96, and then discharged to the sheet discharge tray 121 by the sheet discharge roller pair 21.

The image forming unit 102 is an example of an image forming portion, and a direct transfer-type image forming unit that transfers a toner image formed on an image bearing member directly (i.e., not via an intermediate transfer member) to the sheet S may be used. In addition, a configuration of the sheet discharge apparatus described below may be applied to an image forming apparatus including, instead of an electrophotographic image forming unit, an inkjet image forming unit or an offset printing image forming unit as an image forming portion.

Sheet Discharge Apparatus

Figure 2A:
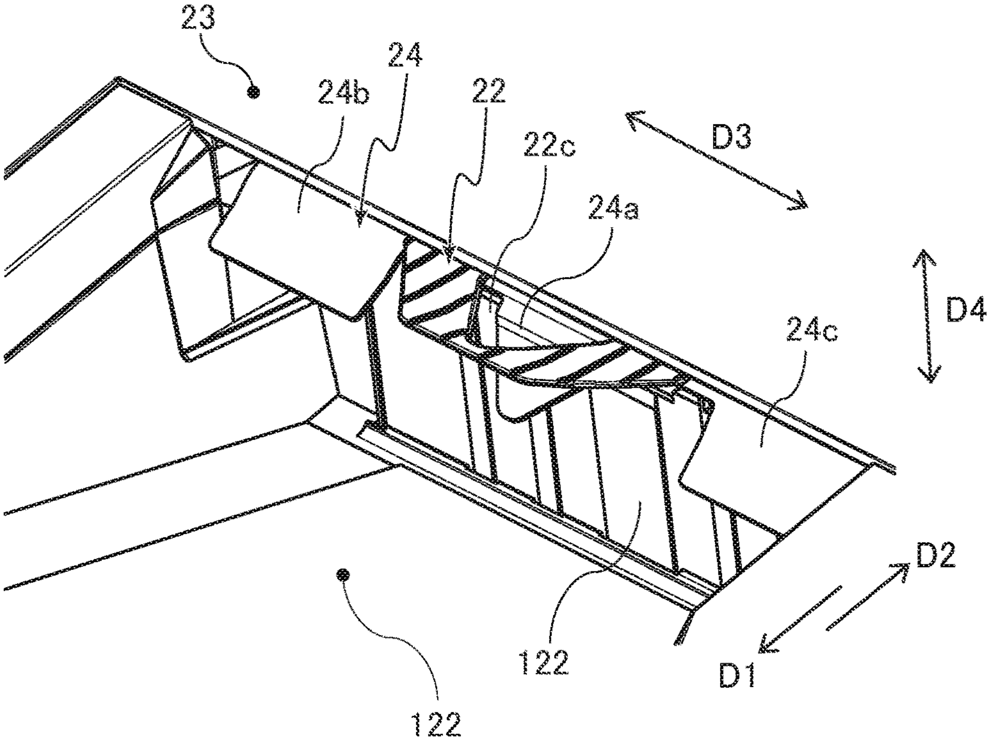
FIGS. 2A and 2B are perspective views of a sheet discharge apparatus according to the first embodiment.
Figure 2B:
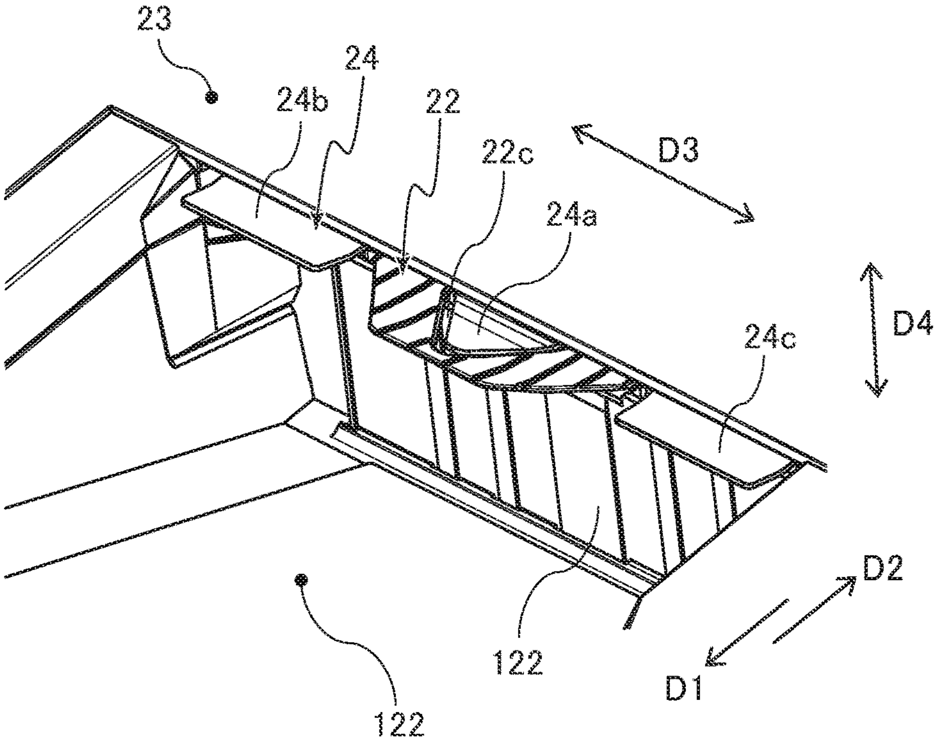
Figure 3:
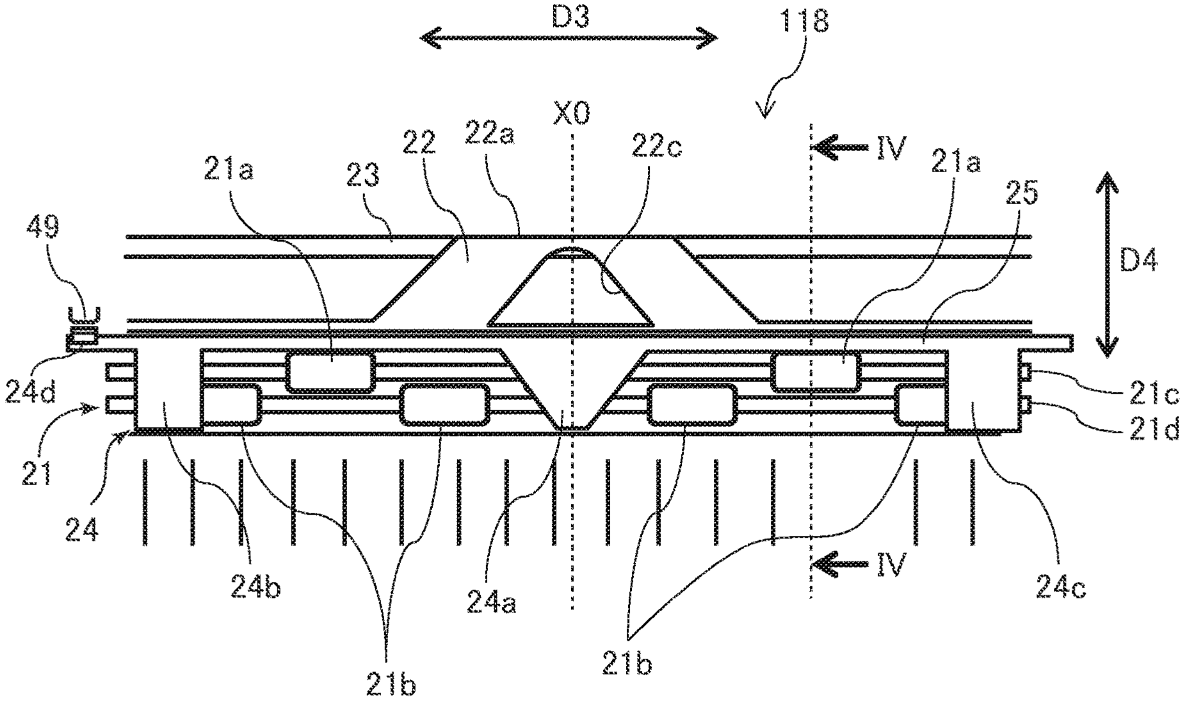
FIG. 3 is a side view of the sheet discharge apparatus according to the first embodiment as seen from the downstream side of a sheet discharge direction.
Figure 4:
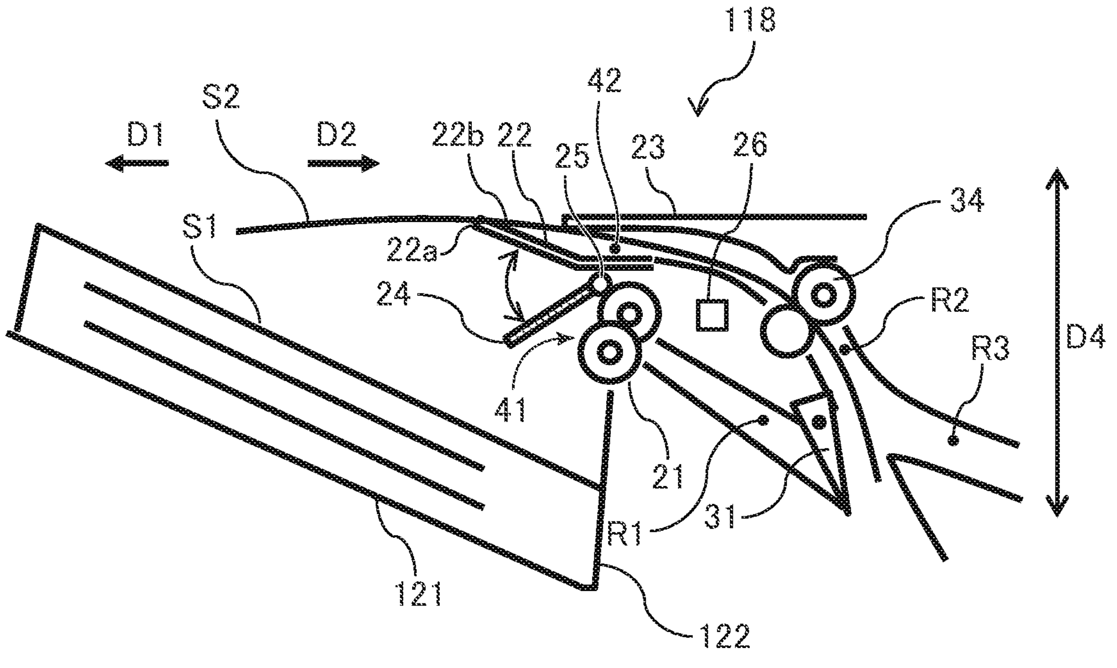
FIG. 4 is a schematic diagram illustrating a cross-sectional configuration of the sheet discharge apparatus according to the first embodiment.

Next, the sheet discharge apparatus 118 will be described in detail. FIGS. 2A and 2B are perspective views of the sheet discharge apparatus 118. FIG. 2A illustrates a state in which a full stack detection flag 24 described below is located at the home position, and FIG. 2B illustrates a state in which the full stack detection flag 24 pivots upward from the home position. FIG. 3 is a side view (schematic view) of the sheet discharge apparatus 118 as viewed from the downstream side in a sheet discharge direction D1 (see FIG. 1). FIG. 4 is a cross-sectional view of the sheet discharge apparatus 118 taken along a plane perpendicular to a sheet width direction D3 at a cutting position indicated by line Iv-Iv in FIG. 3.

As illustrated in FIG. 4, the sheet discharge apparatus 118 includes the reverse tray 22, the full stack detection flag 24, the full stack detection sensor 26, and a top cover 23 in addition to the sheet discharge tray 121, the sheet discharge roller pair 21, the reverse conveyance roller pair 34, and the switching member 31 described above.

In the following description, among the directions of conveyance of the sheet by the sheet discharge roller pair 21 and the reverse conveyance roller pair 34, the direction in which the sheet is discharged toward the sheet discharge tray 121 (the leftward direction in FIGS. 1 and 4) will be referred to as "sheet discharge direction D1", and the opposite direction will be referred to as "reverse direction D2". A horizontal direction orthogonal to the sheet discharge direction D1 and the reverse direction D2 will be referred to as "sheet width direction D3". The vertical direction in a case where the printer 100 is installed on a horizontal plane will be referred to as "vertical direction D4". The sheet width direction D3 is also a main scanning direction (rotation axis direction of the photosensitive drum 1) of the image forming process by the image forming unit 102. The vertical direction D4 can also be said to be a thickness direction of the sheet that is being nipped and discharged by the sheet discharge roller pair 21. The sheet discharge direction D1 is a direction (first conveyance direction) in which the reverse conveyance roller pair 34 serving as a reversing unit conveys the sheet S such that the sheet S is protruded from the apparatus body toward the space above the stack portion, and the reverse direction D2 is a second conveyance direction opposite to the first conveyance direction.

As illustrated in FIG. 3, the sheet discharge roller pair 21 includes a plurality of first rollers 21*a* and a plurality of second rollers 21*b* fixed to two drive shafts 21*c* and 21*d* extending in the sheet width direction D3. The sheet discharge roller pair 21 serving as the first roller pair includes three first rollers 21*a* and four second rollers 21*b* arranged alternately in the sheet width direction D3. The first rollers 21*a* and the second rollers 21*b* slightly overlap each other in the vertical direction D4. That is, when viewed in the sheet width direction D3, the outer peripheral surfaces of the first rollers 21*a* and the outer peripheral surfaces of the second rollers 21*b* partially overlap each other (FIG. 4). Therefore, when passing through the sheet discharge roller pair 21, a sheet S3 is curved in a wavy shape when viewed from the downstream side in the sheet discharge direction D1. That is, the sheet discharge roller pair 21 serving as the first roller pair is configured such that the sheet is vertically wavy along the sheet width direction when the sheet being delivered by the first roller pair is viewed from the downstream side in the first conveyance direction.

Since the sheet S3 is increased in bending stiffness by such waviness (i.e., stiffened by corrugation), the leading edge portion (free end portion) of the sheet S3 delivered from the sheet discharge roller pair 21 is less likely to sag downward. As a result, it is possible to keep the sagging sheet S3 from rubbing against the sheets 51 already stacked on the sheet discharge tray 121 and disturbing the alignment of the sheets 51, and to improve the stackability of the sheets on the sheet discharge tray 121. The discharging unit that can discharge the sheet S3 while stiffening the sheet S3 is not limited to the above-described one. For example, the first rollers 21*a* and the second rollers 21*b* of the sheet discharge roller pair 21 may be arranged in abutment with each other, and a pressing member (stiffening member) that presses the sheet S3 upward or downward may be provided between the first rollers 21*a* arranged in the sheet width direction D3.

As illustrated in FIG. 4, the sheet discharge tray 121 is provided on the upper surface (exterior surface) of the apparatus body 101, and at least a part of the sheet discharge tray 121 is configured as an inclined surface inclined upward from upstream to downstream of the sheet discharge direction D1. The apparatus body 101 has a trailing edge restriction surface 122 rising upward from the upstream end of the sheet discharge tray 121 in the sheet discharge direction D1. The trailing edge restriction surface 122 extends in the vertical direction D4 and the sheet width direction D3 between an opening portion (discharge portion 41) through which the sheet S3 discharged by the sheet discharge roller pair 21 passes in the vertical direction D4 and the sheet discharge tray 121. With such a configuration, the sheet S3 discharged to the sheet discharge tray 121 by the sheet discharge roller pair 21 slides by its own weight upstream in the sheet discharge direction D1 along the inclination of the sheet discharge tray 121, and is aligned by abutment on the trailing edge restriction surface 122.

The reverse conveyance roller pair 34 is arranged inside the apparatus body 101 (upstream in the sheet discharge direction DO as compared with the sheet discharge roller pair 21, and is arranged upstream of the trailing edge restriction surface 122 in the sheet discharge direction D1. The reverse path R2 passes through the portion above the discharge path R1 and opens to the outside of the apparatus body 101 at an opening portion (reverse opening 42) above the discharge port 41. The reverse opening 42 is a space through which the sheet S2 can be passed, which is formed under the top cover 23 on the extension line of the trailing edge restriction surface 122. The reverse conveyance roller pair 34 serving as a reversing unit can convey the sheet S2 (i.e., reversing sheet or a sheet to be reversed) in the sheet discharge direction D1 serving as the first conveyance direction and the reverse direction D2 serving as the second conveyance direction opposite to the first conveyance direction. The reverse conveyance roller pair 34 may be a roller pair (second roller pair) that nips and conveys a sheet at a nip portion where the outer peripheral surfaces of the rollers are in abutment with each other. The sagging of the sheet protruding from the apparatus body 101 during reverse conveyance is restricted by the reverse tray 22 described below, and it is less necessary for the reverse conveyance roller pair 34 to stiffen the sheet. Using a pair of rollers whose outer peripheral surfaces are in abutment with each other as the reverse conveyance roller pair 34 provides an advantage that skew feeding of the sheet is less likely to occur during reverse conveyance.

The reverse tray 22 protrudes from the apparatus body 101 downstream in the sheet discharge direction D1 above the discharge port 41. Therefore, the sheet discharge roller pair 21 is arranged such that the sheet being discharged (i.e., discharging sheet) passes below the reverse tray 22 serving as a support member. The reverse tray 22 protrudes downstream of at least the trailing edge restriction surface 122 in the sheet discharge direction D1. The top cover 23 constituting a part of the upper surface of the apparatus body 101 is provided above the reverse tray 22. The top cover 23 is provided along the reverse tray 22 above the reverse tray 22, and covers the upstream portion of the reverse tray 22 in the sheet discharge direction D1 from above.

The downstream portion of the reverse tray 22 in the sheet discharge direction D1 protrudes in the sheet discharge direction D1 farther than the downstream end of the top cover 23, and is exposed from the top cover 23 when viewed from above. That is, the reverse tray 22 serving as a support member protrudes further downstream of the downstream end of the first cover member in the first conveyance direction. When viewed in the sheet width direction, downstream of the downstream end of the top cover 23 in the sheet discharge direction D1, the reverse tray 22 is inclined such that a more downstream part thereof in the sheet discharge direction is higher, or inclined upward from upstream to downstream of the sheet discharge direction D1. With such a configuration, it is possible to reduce the height of the top cover 23 as much as possible and downsize the printer 100 in the height direction while using the reverse tray 22 having an inclination capable of effectively reducing the sagging of the sheet. As an example, the height of the lower surface of the top cover 23 (the guide surface of the reverse path R2) at the downstream end in the sheet discharge direction D1 may be equal to or less than the height of the upper end of the reverse tray 22 (a distal end portion 22*a* described below). The top cover 23 may cover the reverse tray 22 and the full stack detection flag 24 described below from above.

Further, the downstream end of the reverse tray 22 in the sheet discharge direction D1 protrudes downstream of the downstream end of the full stack detection flag 24 in the sheet discharge direction D1, in a state where the full stack detection flag 24 described below is at the upper limit position. The downstream end of the reverse tray 22 can be arranged to protrude downstream of the downstream end of the full stack detection flag 24 in the sheet discharge direction D1 even in a state where the full stack detection flag 24 is located at any position in a pivoting locus in which the full stack detection flag 24 pivots. The upper surface of the reverse tray 22 may have a plurality of ribs or protrusions (FIGS. 2A and 2B) extending in the sheet discharge direction D1 to enhance the slidability of the sheet. No ribs or protrusions may be provided on the upper surface of the full stack detection flag 24 described below.

As illustrated in FIG. 4, the full stack detection flag 24 pivots (swings) about a pivot shaft 25 (swing shaft) extending in the sheet width direction D3 between the sheet discharge roller pair 21 and the reverse tray 22. The full stack detection flag 24 is a pivotable member that is arranged above the sheet discharge tray 121 serving as a stack portion, is positioned below the reverse tray 22 serving as a support member in a state of not being in abutment with the sheet, and pivots upward by being abutted by the sheet. The full stack detection sensor 26 is a detector configured such that the detection signal changes according to the pivot angle of the full stack detection flag 24. The full stack detection sensor 26 may be, for example, a photoelectric sensor (photointerrupter) in which a voltage value serving as a detection signal changes by being light-shielded by a light shielding portion (flag) attached to an end portion of the pivot shaft 25 of the full stack detection flag 24.

The controller 103 (FIG. 1) determines the full-stack state of the sheet discharge tray 121 based on the detection signal from the full stack detection sensor 26. That is, when the sheets 51 are stacked on the sheet discharge tray 121, the full stack detection flag 24 is pressed by the uppermost one of the stacked sheets 51, and the full stack detection flag 24 pivots upward around the pivot shaft 25 in the clockwise direction illustrated in the drawing. When the full stack detection flag 24 pivots from the home position by a predetermined angle or more, the detection signal output from the full stack detection sensor 26 is changed, and a signal indicating that the sheet discharge tray 121 is in the full-stack state is output. In other words, the position of the full stack detection flag 24 at which the detection signal from the full stack detection sensor 26 is changed defines the stacking amount (maximum stacking amount) of the sheets S1 that can be stacked on the sheet discharge tray 121 in the present embodiment. When detecting the full-stack state of the sheet discharge tray 121, the controller 103 interrupts the image forming operation being executed, emits a screen display, an audio alert, or the like on the operation panel, and prompts the user to remove the sheets S1 from the sheet discharge tray 121.

In the present embodiment, the full stack detection flag 24 and the full stack detection sensor 26 are also used for the purpose of monitoring the discharge of the sheet S3 by the sheet discharge roller pair 21. That is, when the sheet S3 is normally discharged by the sheet discharge roller pair 21, the full stack detection flag 24 is pivoted by the sheet S3 at a predetermined timing, and the detection signal from the full stack detection sensor 26 changes. The predetermined timing is a timing at which the full stack detection flag 24 should be pivoted by the sheet S3 by a predetermined angle or more when the conveyance of the sheet S3 has proceeded normally with reference to a time point at which the sheet S3 was detected by the sensor upstream of the sheet discharge roller pair 21.

When the sheet discharge tray 121 is not in the full-stack state, the full stack detection flag 24 returns to the home position in a period (sheet interval) from when the sheet discharge roller pair 21 completes the discharge of a preceding sheet to when the sheet discharge roller pair 21 starts the discharge of the succeeding sheet. When the sheet discharge tray 121 is not in the full-stack state, the full stack detection sensor 26 outputs a detection signal indicating that the sheet is detected while the sheet S3 is discharged from the sheet discharge roller pair 21, and outputs a detection signal indicating that the sheet is not detected at the sheet intervals. The home position is a position where the full stack detection flag 24 is not in abutment with either the sheet S3 being discharged or the stacked sheets S1 (position determined by its own weight or lower position).

The controller 103 determines a jam of the sheet S3 or sheet jam based on the detection signal from the full stack detection sensor 26. Specifically, when the detection signal from the full stack detection flag 24 does not change so as to indicate the state of detecting a sheet even after a lapse of the predetermined timing, the controller 103 determines that a sheet conveyance failure (jam) has occurred. If detecting a jam of the sheet, the controller 103 interrupts the image forming operation being executed, emits a screen display or an audio alert on the operation panel, and prompts the user to remove the jammed sheet in a predetermined procedure.

Shape of Reverse Tray

As illustrated in FIGS. 2A, 2B, 3, and 4, the reverse tray 22 serving as a support member is formed so as to be inclined upward from the proximal end side toward the distal end portion 22*a*. That is, at least a part of the reverse tray 22 (downstream portion or distal end portion) is inclined upward toward the downstream side in the sheet discharge direction D1. The reverse tray 22 is formed in a trapezoidal shape in which the side of the distal end is shorter than the side of the proximal end (the apparatus body 101 side) over an area including a central position X0 (FIG. 3) of the sheet discharge roller pair 21 in the sheet width direction D3. In the reverse tray 22, a central portion 22*b* including the distal end portion 22*a* protrudes toward the top cover 23 (that is, upward). The central position X0 of the sheet discharge roller pair 21 in the sheet width direction D3 is an intermediate position between an end position on one side and an end position on the other side in the sheet width direction D3 in an area where one of the plurality of first rollers 21*a* and the plurality of second rollers 21*b* is in contact with the sheet.

An opening hole 22*c* having a substantially triangular shape is provided in the central portion 22*b* of the reverse tray 22. The opening hole 22*c* is an opening portion that forms a space penetrating the reverse tray 22 from the upper surface to the lower surface. Further, the opening hole 22*c* is a hole surrounding the periphery of a central protruding portion 24*a* of the full stack detection flag 24 described below. The reverse tray 22 includes a protruding portion that protrudes downstream in the sheet discharge direction D1 on both sides of the opening hole 22*c* in the sheet width direction D3, and a connecting portion that connects these protruding portions to each other in the sheet width direction D3 downstream of the opening hole 22*c* in the sheet discharge direction D1. The opening hole 22*c* has a hole shape surrounded by the protruding portions and the connecting portion.

The central portion 22*b* of the reverse tray 22 supports the lower surface of the sheet S2 while sliding on the sheet S2 being reversely conveyed by the reverse conveyance roller pair 34, and restricts the leading edge portion of the sheet S2 in the sheet discharge direction D1 from hanging down due to its own weight. At this time, since the reverse tray 22 is arranged in the central region in the sheet width direction D3 and is inclined such that a more downstream part thereof in the sheet discharge direction D1 is higher, so that it is possible to restrict sagging of the sheet S2 more effectively during reverse conveyance. That is, the sheet S2 whose lower surface is supported by the central portion 22*b* of the reverse tray 22 is curved such that the central portion in the sheet width direction D3 protrudes upward, and the bending stiffness (rigidity) along the sheet discharge direction D1 is improved.

Shape of Full Stack Detection Flag

Next, the shape of the full stack detection flag 24 will be described. As illustrated in FIG. 3, the full stack detection flag 24 includes the central protruding portion 24*a* located at the central portion in the sheet width direction D3 and side protruding portions 24*b* and 24*c* located at both ends in the sheet width direction D3. The central protruding portion 24*a* and the side protruding portions 24*b* and 24*c* protrude radially outward (downstream in the sheet discharge direction DO from the pivot shaft 25.

The central protruding portion 24*a* is an inner part of the pivotable member according to the present embodiment provided at a position corresponding to the opening hole 22*c* of the reverse tray 22 in the sheet width direction D3. The central protruding portion 24*a* is formed in a shape similar to and slightly smaller than the opening hole 22*c* of the reverse tray 22. That is, the inner part of the pivotable member has a shape similar to the opening portion of the support member, and the outer periphery of the inner part is configured to face the inner periphery of the opening portion with a predetermined gap in between.

The side protruding portions 24*b* and 24*c* are outer parts of the pivotable member according to the present embodiment provided on both outer sides of the support member in the sheet width direction. The side protruding portions 24*b* and 24*c* of the present embodiment are formed in a rectangular shape when viewed from above.

As illustrated in FIG. 3, the apparatus body 101 is provided with a stopper 49 serving as a restrictor that restricts pivoting of the full stack detection flag 24. The stopper 49 abuts on a projection 24*d* provided on the pivot shaft 25 of the full stack detection flag 24, thereby restricting the full stack detection flag 24 from pivoting more upward beyond a predetermined upper limit position (upper position) and protruding more upward than the reverse tray 22. The upper limit position of the full stack detection flag 24 is assumed to be at least a position equal to or higher than the position where the detection signal from the full stack detection sensor 26 is changed. Note that the position and shape of the stopper 49 are examples, and can be appropriately changed as long as the pivoting of the full stack detection flag 24 can be restricted at a predetermined upper limit position. For example, a projection may be provided integrally with the central protruding portion 24*a* of the full stack detection flag 24 so as to abut on the lower surface of the reverse tray 22.

Figure 5:
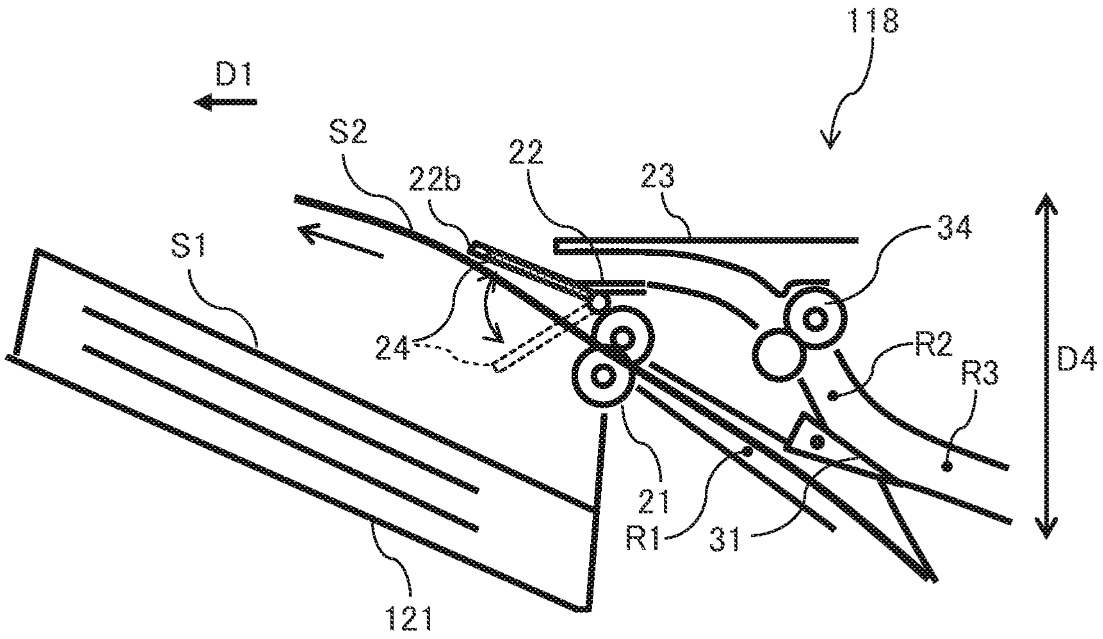
FIG. 5 is a schematic diagram illustrating a pivotable range of a full stack detection flag according to the first embodiment.

When the full stack detection flag 24 is located at the home position, as illustrated in FIG. 4, the central protruding portion 24*a* or the side protruding portions 24*b* and 24*c* of the full stack detection flag 24 are located below the reverse tray 22. When the stacked amount of the sheets S1 on the sheet discharge tray 121 increases and the central protruding portion 24*a* or the side protruding portions 24*b* and 24*c* are pushed up by the stacked sheets S1, the full stack detection flag 24 pivots upward from the home position. Also at the time of discharge of the sheet S3 by the sheet discharge roller pair 21, the full stack detection flag 24 is pushed up by the sheet S3 being discharged and pivots upward from the home position (FIG. 5). When the projection 24*d* of the full stack detection flag 24 abuts on the stopper 49, the upward pivoting of the full stack detection flag 24 is restricted, and the full stack detection flag 24 is held at the upper limit position not protruding more upward than the reverse tray 22.

As illustrated in FIG. 5, in a state where at least the full stack detection flag 24 is located at the upper limit position, the central protruding portion 24*a* and the side protruding portions 24*b* and 24*c* of the full stack detection flag 24 overlap the reverse tray 22 when viewed in the sheet width direction D3. In the state where the full stack detection flag 24 is located at the upper limit position, the upper surface of the full stack detection flag 24 and the upper surface of the reverse tray 22 form substantially the same plane.

In a state where the full stack detection flag 24 is located at the upper limit position, the central protruding portion 24*a* of the full stack detection flag 24 enters the opening hole 22*c* of the reverse tray 22. That is, in the present embodiment, the support member is provided with the opening portion penetrating the support member in the vertical direction, and the pivotable member has the inner part that enters the inside of the opening portion in a state where the pivotable member overlaps the support member when viewed in the sheet width direction. In this state, the central protruding portion 24*a* of the full stack detection flag 24 blocks at least a part of the opening region of the opening hole 22*c* of the reverse tray 22, whereby it is possible to reduce water vapor discharged from the discharge port going toward the upper surface of the reverse tray 22. Since the water vapor hardly goes toward the upper surface of the reverse tray 22, it is possible to reduce the possibility that the sheet reversely conveyed by the reverse conveyance roller pair 34 gets wet to cause an image defect at the time of forming an image on the second side.

In addition, the central protruding portion 24*a* of the full stack detection flag 24 has a shape similar to the opening hole 22*c* of the reverse tray 22 and is formed slightly smaller than the opening hole 22*c*. That is, the inner part of the pivotable member has a shape similar to the opening portion of the support member, and the outer periphery of the inner part is formed to face the inner periphery of the opening portion with a predetermined gap in between. As a result, it is possible to effectively reduce water vapor going toward the upper surface of the reverse tray 22 and reduce the possibility that, when pivoting upward, the full stack detection flag 24 contacts the reverse tray 22 and generates a sudden sound (collision sound). The predetermined gap is a margin set so that the central protruding portion 24*a* does not contact the opening hole 22*c* in consideration of component tolerance, assembly tolerance, and the like.

Summary of the Present Embodiment

As described above, as illustrated in FIG. 5, at least in a state where the full stack detection flag 24 is located at the upper limit position, the central protruding portion 24*a* and the side protruding portions 24*b* and 24*c* of the full stack detection flag 24 overlap the reverse tray 22 when viewed in the sheet width direction D3. That is, in the present embodiment, when viewed in the sheet width direction perpendicular to the first conveyance direction, a part of the pivoting locus in which the pivotable member pivots overlaps the support member. As described above, in the present embodiment, the pivotable member for detecting the sheet and the support member that supports the sheet at the time of reverse conveyance are arranged to be allowed to partially overlap with each other in the vertical direction. This makes it possible to realize the function of detecting the sheet and the function of supporting the sheet being reversely conveyed in a height-wise compact configuration.

As a comparative example, a printer in which the entire pivoting locus of the full stack detection flag 24 is located below the reverse tray 22 as viewed in the sheet width direction D3 is assumed. As compared with this comparative example, applying the configuration of the present embodiment makes it possible to move the position of the reverse tray 22 downward while maintaining the position of the full stack detection flag 24, for example. In this case, moving the top cover 23 and the like downward in accordance with the reverse tray 22 allows downsizing of the printer in the height direction (vertical direction). At this time, since the position of the full stack detection flag 24 does not change, the stacked amount of the sheets S1 that can be stacked on the sheet discharge tray 121 does not decrease. In addition, shifting the position of the full stack detection flag 24 upward while maintaining the position of the reverse tray 22 as compared with the comparative example makes it possible to increase the stacked amount of the sheets S1 that can be stacked on the sheet discharge tray 121 without increasing the size of the printer. That is, with the configuration of the present embodiment, it is possible to achieve both downsizing the image forming apparatus in the height direction (vertical direction) and increasing the stacked amount of sheets in the stack portion.

In the state where the full stack detection flag 24 is located at the upper limit position, the upper surface of the full stack detection flag 24 and the upper surface of the reverse tray 22 form substantially the same plane. In other words, in the present embodiment, the upper surface of the pivotable member and the upper surface of the support member overlap each other when viewed in the sheet width direction in a state where the pivotable member is in abutment with the restricting portion.

Note that in double-sided printing, passing-each-other conveyance is performed such that the trailing edge portion of the sheet S2 (the leading edge portion in the sheet discharge direction DO drawn by the reverse conveyance roller pair 34 in the reversing direction D2 and the leading edge portion of the sheet S3 discharged by the sheet discharge roller pair 21 pass each other in the vicinity of the full stack detection flag 24. In the present embodiment, since the pivot angle of the full stack detection flag 24 is restricted by the stopper 49, it is possible to reduce noise or generation of rubbing marks due to collision of the full stack detection flag 24 with the sheet S2 in the passing-each-other conveyance.

The reverse tray 22 of the present embodiment is provided in the central area in the sheet width direction D3 and is inclined upward from upstream to downstream of the sheet discharge direction D1, thereby reducing the possibility that the sheet S2 being reversed hangs down and comes into contact with the sheet S3 being discharged in the passing-each-other conveyance. In addition, the side protruding portions 24*b* and 24*c* of the full stack detection flag 24 are interposed between the sheets S2 and S3 in the area outside the reverse tray 22 in the sheet width direction D3, so that it is possible to reduce the possibility that the side edge portions of the sheets S2 and S3 come into contact with each other and rub against each other in the passing-each-other conveyance.

Second Embodiment

Next, a second embodiment will be described. Hereinafter, elements denoted by the same reference numerals as those in the first embodiment have substantially the same configurations and functions as those described in relation to the first embodiment, and differences from the first embodiment will be mainly described.

Figure 6:
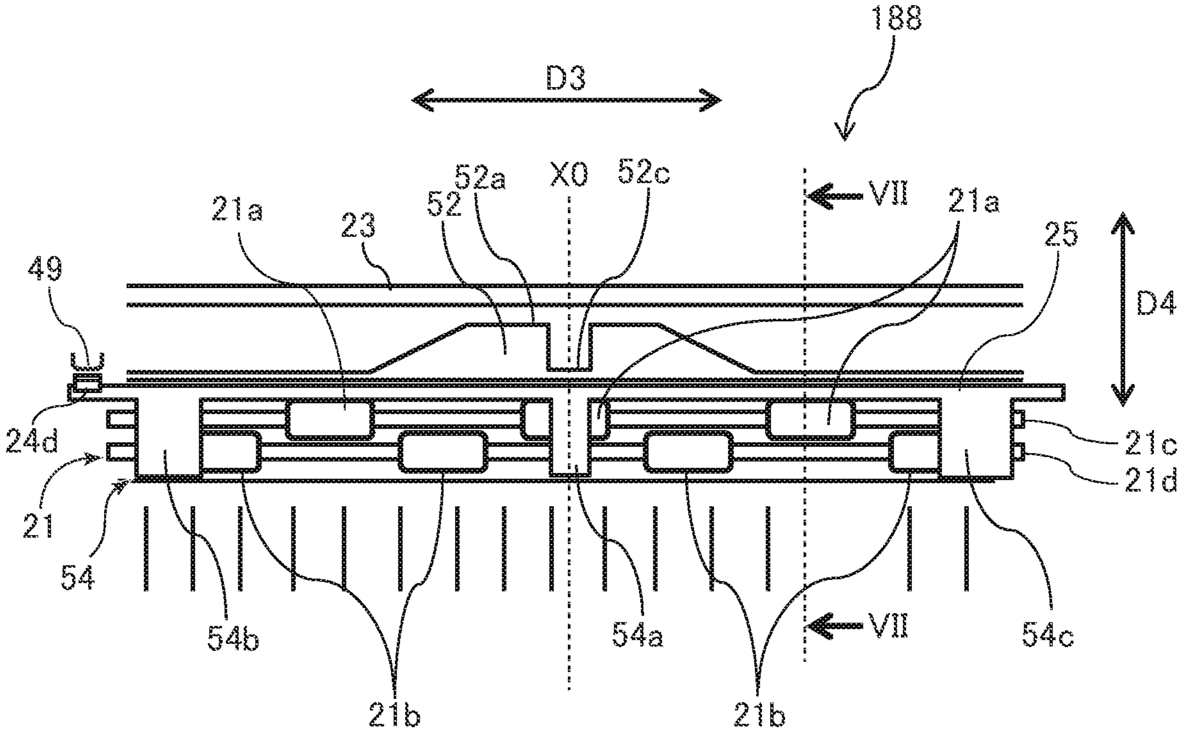
FIG. 6 is a side view of a sheet discharge apparatus according to a second embodiment as seen from the downstream side of a sheet discharge direction.

As illustrated in FIG. 6, a reverse tray 52 serving as a support member according to the present embodiment has a cutout portion 52*c* serving as an opening portion, instead of the opening hole 22*c* in the first embodiment. That is, when viewed from above, the opening portion of the present embodiment has a recessed shape in which a part in a sheet width direction D3 of the downstream end of the support member in a sheet discharge direction D1 (first conveyance direction) is recessed toward the upstream side in the sheet discharge direction D1. A full stack detection flag 54 includes a central protruding portion 54*a* (inner part) located at a central portion in the sheet width direction D3 and side protruding portions 54*b* and 54*c* (outer part) located at both ends in the sheet width direction D3. The central protruding portion 54*a* has substantially the same shape (rectangular shape) as the cutout portion 52*c* of the reverse tray 52 and has a width slightly narrower than the inner width of the cutout portion 52*c*.

Figure 7:
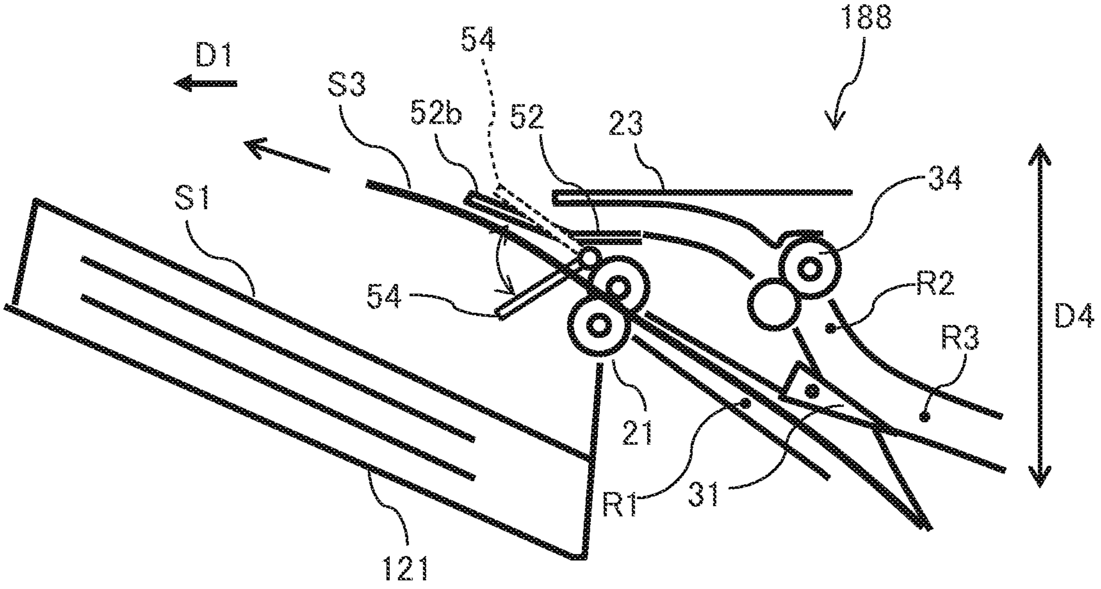
FIG. 7 is a schematic diagram illustrating a cross-sectional configuration of the sheet discharge apparatus according to the second embodiment.

As illustrated in FIG. 7, when a sheet S3 is discharged in the sheet discharge direction D1 by a sheet discharge roller pair 21, the full stack detection flag 54 is pressed and pivoted by the sheet S3, and is located at a position swung upward as indicated by a broken line. At this time, the central protruding portion 54*a* of the full stack detection flag 54 enters the inside of the cutout portion 52*c* of the reverse tray 52, and the full stack detection flag 54 partially overlaps the reverse tray 52 as viewed in the sheet width direction D3. That is, also in the present embodiment, when viewed in the sheet width direction perpendicular to the first conveyance direction, a part of the pivoting locus in which the pivotable member pivots overlaps the support member. This makes it possible to realize the function of detecting the sheet and the function of supporting the sheet being reversely conveyed in a height-wise compact configuration. As a result, with the configuration of the present embodiment, it is possible to achieve both downsizing the image forming apparatus in the height direction (vertical direction) and increasing the stacked amount of sheets in the stack portion. In addition, providing the cutout portion 52*c* serving as the opening portion makes it possible to reduce the possibility that, at the time of pivoting, the full stack detection flag 54 collides with the reverse tray 52 and generates a sudden sound or the like.

The leading edge portion 52*a* of the reverse tray 52 may be located in the entire area in the sheet width direction D3. The cutout portion 52*c* of the reverse tray 52 may have any size at a position not overlapping with the central protruding portion 54*a* and the side protruding portions 54*b* and 54*c* of the full stack detection flag 54, and the reverse tray 52 may have a plurality of cutout portions.

Modification Examples

In the above-described embodiments, the full stack detection flag 24 also serves as the pivotable member for detecting the discharge of the sheets, but a pivotable member for detecting the discharge of the sheets may be provided separately from the detection mechanism for detecting the full-stack state of the sheet discharge tray 121. That is, the "pivotable member" may be used only for either the purpose of detecting the discharged sheet or the purpose of detecting the sheet on the stack portion. Even in this case, applying each embodiment makes it possible to realize the function of detecting the sheet and the function of supporting the sheet being reversely conveyed in a height-wise compact configuration.

In the above-described embodiments, the change in the detection signal from the full stack detection sensor 26 corresponding to the presence or absence of the discharge of the sheets is not necessarily the same as the change in the detection signal from the full stack detection sensor 26 corresponding to whether or not the sheet discharge tray 121 is in the full-stack state. For example, a detector may be provided by a combination of a sensor whose a detection signal changes when the full stack detection flag 24 pivots to a first angle with reference to the home position and a sensor whose a detection signal changes when the full stack detection flag 24 pivots to a second angle larger than the first angle.

In addition, the specific configurations of the full stack detection flag, the reverse tray, and the like in the above-described embodiment are merely examples, and their shapes, arrangements, and the like can be appropriately changed. For example, the reverse tray may be provided over the entire area of the reverse path R2 in the sheet width direction D3. It is also conceivable to omit either the central protruding portion (inner part) or the side protruding portions (outer parts) of the full stack detection flag.

Furthermore, in the above-described embodiments, the sheet discharge apparatus discharges the sheet from the apparatus body of the image forming apparatus. However, the present technology may be applied to, for example, a sheet discharge apparatus that is an optional device detachably installed on the top of the image forming apparatus (an apparatus including the image forming portion).

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-090900, filed on May 31, 2021, which is hereby incorporated by reference herein in its entirety.

What is claimed is:

1. A sheet discharge apparatus comprising:

a stack portion on which a sheet discharged from an apparatus body is stacked;

a reversing unit configured to reverse a reversing sheet by conveying the reversing sheet such that the reversing sheet is protruded from the apparatus body in a first conveyance direction toward a space above the stack portion and then conveying the reversing sheet in a second conveyance direction opposite to the first conveyance direction;

a support member configured to support a lower surface of the reversing sheet being conveyed by the reversing unit, the support member being protruded in the first conveyance direction from the apparatus body in the space above the stack portion;

a discharging unit configured to discharge a discharging sheet from the apparatus body, the discharging unit being arranged such that the discharging sheet passes below the support member;

a pivotable member arranged above the stack portion, positioned below the support member in a state where the pivotable member is not abutted by the discharging sheet, and configured to pivot upward by being abutted by the discharging sheet so that the pivotable member is in an upward position;

a detector configured to output a detection signal that changes according to a pivot angle of the pivotable member; and a cover member constituting an upper surface of the apparatus body, wherein when viewed in a sheet width direction perpendicular to the first conveyance direction, a pivoting locus in which the pivotable member pivots overlaps the support member, wherein when viewed in the sheet width direction in a state where the pivotable member is in the upward position, a part of an upper surface of the pivotable member and a part of a lower surface of the support member are in same position with respect to a horizontal direction, and the part of the upper surface of the pivotable member is higher than the part of the lower surface of the support member, wherein the support member is provided with an opening portion penetrating the support member in a vertical direction, wherein the support member protrudes further downstream of a downstream end of the cover member in the first conveyance direction, wherein the pivotable member includes an inner part that is configured to enter inside the opening portion in a state where the pivotable member overlaps the support member when viewed in the sheet width direction, and wherein when viewed from above, the opening portion has a recessed shape in which a part, in the sheet width direction, of a downstream end of the support member in the first conveyance direction is recessed toward an upstream side in the first conveyance direction.

2. The sheet discharge apparatus according to claim 1, further comprising a stopper configured to abut on the pivotable member and restrict the pivotable member from protruding more upward than the support member.

3. The sheet discharge apparatus according to claim 2, wherein when viewed in the sheet width direction in a state where the pivotable member is in abutment with the stopper, the upper surface of the pivotable member and an upper surface of the support member overlap each other.

4. The sheet discharge apparatus according to claim 1, wherein a downstream end of the support member in the first conveyance direction protrudes more downstream in the first conveyance direction than a downstream end of the pivotable member in the first conveyance direction in a state where the pivotable member is located at an upper limit position of the pivoting locus.

5. The sheet discharge apparatus according to claim 1, wherein the support member is provided over an area including a central position of the discharging unit in the sheet width direction, and wherein the pivotable member includes outer parts provided on both outer sides of the support member in the sheet width direction.

6. The sheet discharge apparatus according to claim 1, wherein when viewed in the sheet width direction, on a downstream side of the downstream end of the cover member in the first conveyance direction, an upper surface of the support member is inclined such that a more downstream part thereof in the first conveyance direction is higher.

7. The sheet discharge apparatus according to claim 1, further comprising a controller configured to determine a full-stack state of the stack portion based on the detection signal from the detector.

8. The sheet discharge apparatus according to claim 1, further comprising a controller configured to determine a sheet jam based on the detection signal from the detector.

9. The sheet discharge apparatus according to claim 1, wherein the discharging unit includes a first roller pair configured to nip and convey the discharging sheet such that the discharging sheet is vertically wavy along the sheet width direction, when the discharging sheet being delivered by the first roller pair is viewed from a downstream side in the first conveyance direction, and wherein the reversing unit includes a second roller pair that has a nip portion at which outer peripheral surfaces of the second roller pair are in abutment with each other and that nips and conveys the reversing sheet in the nip portion.

10. An image forming apparatus comprising:

an image forming portion configured to form an image on a sheet; and the sheet discharge apparatus according to claim 1 configured to discharge a sheet on which an image is formed by the image forming portion.

* * * * *